(12) United States Patent
Yu et al.

(10) Patent No.: US 8,304,946 B2
(45) Date of Patent: Nov. 6, 2012

(54) SPINDLE MOTOR

(75) Inventors: Chang Jo Yu, Gyunggi-do (KR); Duck Young Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 811 days.

(21) Appl. No.: 12/382,358

(22) Filed: Mar. 13, 2009

(65) Prior Publication Data

US 2010/0148606 A1 Jun. 17, 2010

(30) Foreign Application Priority Data

Dec. 16, 2008 (KR) ........................ 10-2008-0127819

(51) Int. Cl.
*H02K 5/16* (2006.01)
*F16C 32/06* (2006.01)
(52) U.S. Cl. ........... 310/90; 384/119; 384/131; 384/132
(58) Field of Classification Search .................... 310/90; 384/119, 131, 132
See application file for complete search history.

(56) References Cited

U.S. PATENT DOCUMENTS 5,558,445 A * 9/1996 Chen et al. ................... 384/132

FOREIGN PATENT DOCUMENTS

| JP | 2005-016672 | 1/2005 |
|----|-------------|--------|
| JP | 2006-275246 | 10/2006 |
| KR | 10-0820767 | 4/2008 |

OTHER PUBLICATIONS

Korean Patent Office Action, dated Jun. 24, 2010.

* cited by examiner

*Primary Examiner* — Quyen Leung
*Assistant Examiner* — David Scheuermann

(57) ABSTRACT

The present invention provides a spindle motor which has superior operating characteristics. The spindle motor includes a stationary support shaft which is fastened to a base plate, a thrust plate which is fitted over the stationary support shaft, a sleeve which is rotatably provided around the stationary support shaft and is coupled to a rotor casing, and an annular stopper which is fastened to the sleeve or the rotor casing to support the lower surface of the thrust plate and prevent the sleeve from being removed. A first fluid sealing part is formed between the stopper and the thrust plate. The spindle motor further includes an annular sealing cap which is coupled to the sleeve or the rotor casing to store fluid between the sealing cap and an upper surface of the sleeve. A second fluid sealing part is formed between the sealing cap and the stationary support shaft.

17 Claims, 9 Drawing Sheets

380

SPINDLE MOTOR

CROSS REFERENCE TO RELATED APPLICATION

This application claims the benefit of Korean Patent Application No. 10-2008-0127819, filed Dec. 16, 2008, entitled "Spindle motor", which is hereby incorporated by reference in its entirety into this application.

BACKGROUND OF THE INVENTION

1. Field of the Invention

The present invention relates generally to spindle motors and, more particularly, to a spindle motor which includes a stationary support shaft and a sleeve fitted over the stationary support shaft so as to be rotatable, and is constructed such that stable operating characteristics against external vibration can be ensured.

2. Description of the Related Art

Generally, in spindle motors, bearings which are provided around rotating shafts rotatably support the rotating shafts, thus ensuring a high level of operating characteristics. Because of these characteristics, the spindle motors are widely used as drive units of recording media, such as hard disk drives, magnetic disk drives, etc., which need high speed rotation.

Such a spindle motor uses a fluid dynamic bearing which is operated in such a way that a predetermined amount of fluid is injected between a rotating shaft and a sleeve, which coaxially supports the rotating shaft, so as to form dynamic pressure when the rotating shaft rotates, thus making the rotation of the rotating shaft smoother.

However, in the case where the rotating shaft is used in the spindle motor, when external impact is applied to the spindle motor, the amplitude of vibration of the rotating shaft and the rotor casing supported by the rotating shaft is excessively increased. To solve this problem, the use of a stationary support shaft in place of the rotating shaft is needed for the spindle motor.

SUMMARY OF THE INVENTION

The present invention has been made in an effort to provide a spindle motor which has a stationary support shaft, the upper and lower ends of which are stationary, so that even if external vibration is applied to the spindle motor, the amplitude of vibration thereof can be reduced, and when the spindle motor rotates at a high speed, a high level of operating characteristics can be ensured.

In a spindle motor according to an embodiment of the present invention, a stationary support shaft is perpendicularly fastened to a base plate. A thrust plate is fitted over the stationary support shaft at a position adjacent to the base plate. A sleeve is fitted over the stationary support shaft so as to be rotatable and is coupled to a rotor casing, onto which a magnetic disk is seated. The rotor casing surrounds the circumferential outer surface of the sleeve. An annular stopper is fastened to the sleeve or the rotor casing to support a lower surface of the thrust plate and prevent the sleeve from being removed from the stationary support shaft. The stopper forms a first fluid sealing part between the stopper and the thrust plate. An annular sealing cap is coupled to the sleeve or the rotor casing to store fluid between the sealing cap and an upper surface of the sleeve and form a second fluid sealing part between the sealing cap and the stationary support shaft.

The sleeve may form first and second radial bearings using dynamic pressure between the sleeve and the stationary support shaft and form a first thrust bearing between the sleeve and the thrust plate.

The stopper may form a second thrust bearing between the stopper and the thrust plate.

Furthermore, first and second dynamic pressure generating grooves may be formed in the sleeve to form the first and second radial bearings. At least one of the first and second dynamic pressure generating grooves may have an asymmetrical herringbone shape. The first and second dynamic pressure generating grooves may pump fluid between the sleeve and the stationary support shaft towards the first thrust bearing.

The sleeve may have therein a fluid circulation hole, through which the fluid, pumped by the first and second radial bearings, is moved to the first and second radial bearing via the sealing cap such that the fluid circulates around the sleeve.

The fluid circulation hole may extend from a lower surface of the sleeve which faces the thrust plate to the upper surface of the sleeve which faces the sealing cap.

The sealing cap may be fastened to an end of the sleeve to store the fluid between the sealing cap and the sleeve.

The fluid circulation hole may comprise a D-shaped hole defined between the sleeve and the rotor casing by cutting off a portion of the circumferential outer surface of the sleeve in an axial direction.

The sealing cap may be fastened to an end of the rotor casing to store the fluid between the sealing cap and the sleeve.

The rotor casing may have a magnet to form a magnetic field. The base plate may have a metal yoke at a position facing the magnet to form an attractive force between the metal yoke and the magnet.

In a spindle motor according to another embodiment of the present invention, a stationary support shaft is perpendicularly fastened to a base plate. A thrust plate is fitted over the stationary support shaft at a position adjacent to the base plate. A sleeve is fitted over the stationary support shaft so as to be rotatable and is coupled to a rotor casing, onto which a magnetic disk is seated. The rotor casing surrounds a circumferential outer surface of the sleeve. The sleeve forms a first fluid sealing part between the sleeve and the stationary support shaft. An annular stopper is fastened to the sleeve or the rotor casing to support a lower surface of the thrust plate and prevent the sleeve from being removed from the stationary support shaft. The stopper forms a second fluid sealing part between the stopper and the thrust plate. An annular sealing plate is coupled to the sleeve or the rotor casing to store fluid between the sealing plate and an upper surface of the sleeve and form a third fluid sealing part between the sealing plate and the sleeve.

The sleeve may form first and second radial bearings using dynamic pressure between the sleeve and the stationary support shaft and form a first thrust bearing between the sleeve and the thrust plate.

The stopper may form a second thrust bearing between the stopper and the thrust plate.

Furthermore, first and second dynamic pressure generating grooves may be formed in the sleeve to form the first and second radial bearings. At least one of the first and second dynamic pressure generating grooves may have an asymmetrical herringbone shape.

The sleeve may have therein a communication hole, through which fluid, contained in the first fluid sealing part and the second fluid sealing part, is transported to the third fluid sealing part.

The communication hole may extend from a lower surface of the sleeve which faces the thrust plate to the upper surface of the sleeve which faces the sealing plate.

The sealing plate may be fastened to an end of the sleeve to store the fluid between the sealing plate and the sleeve, having the communication hole.

The communication hole may comprise a D-shaped hole defined between the sleeve and the rotor casing by cutting off a portion of the circumferential outer surface of the sleeve in an axial direction.

The sealing plate may be fastened to an end of the rotor casing to store the fluid between the sealing plate and the sleeve, having the communication hole.

The rotor casing may have a magnet to form a magnetic field. The base plate may have a metal yoke at a position facing the magnet to form an attractive force between the metal yoke and the magnet.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of a spindle motor according to the present invention will be described in detail with reference to the attached drawings.

First Embodiment 1

Figure 1:
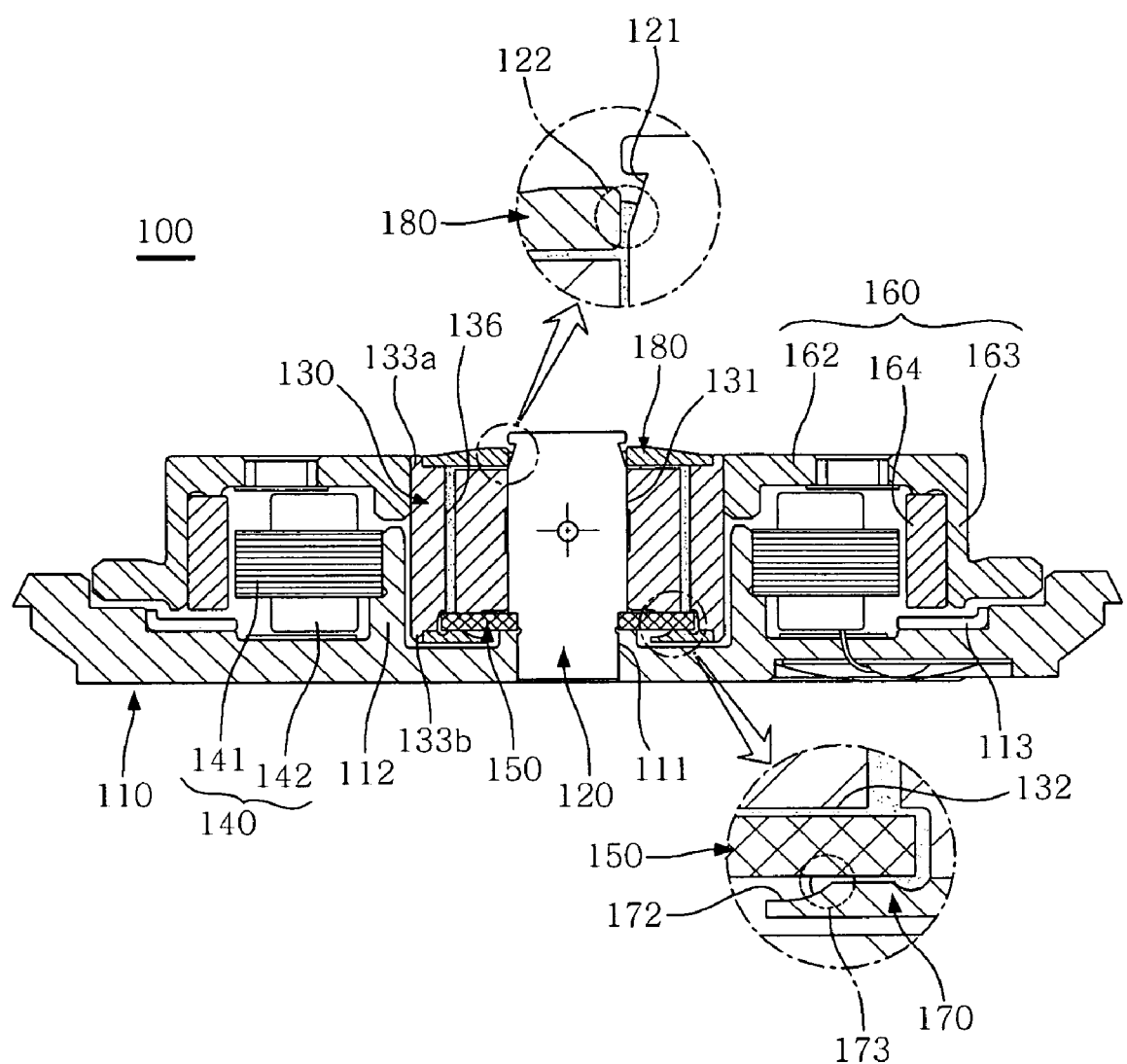
FIG. 1 is a sectional view of a spindle motor, according to a first embodiment of the present invention.

As shown in FIG. 1, a spindle motor 100 according to a first embodiment of the present invention includes a base plate 110, a stationary support shaft 120, a sleeve 130, an armature 140, a thrust plate 150, a rotor casing 160, a stopper 170 and a sealing cap 180.

The base plate 110 supports the entire spindle motor 100 thereon and is mounted to a device, such as a hard disk drive or the like, in which the spindle motor 100 is installed. Here, the base plate 110 is typically made of light material, such as an aluminum plate or aluminum alloy plate, or, alternatively, it may be made of a steel plate.

Furthermore, a coupling hole 111 is formed through a central portion of the base plate 110, and the stationary support shaft 120 is fitted into the coupling hole 111 of the base plate 110. A fitting protrusion 112, over which the armature 140 is fitted, is provided on the central portion of the base plate 110. The coupling hole 111 preferably has a diameter equal to the outer diameter of the stationary support shaft 120 such that the stationary support shaft 120 is firmly fitted into the coupling hole 111. In other words, the stationary support shaft 120 is inserted into and fastened to the coupling hole 111. Here, a separate laser welding process may be conducted to firmly fasten the stationary support shaft 120 to the coupling hole 111 or, alternatively, the stationary support shaft 120 may be fastened to the coupling hole 111 in such a way as to force-fit the stationary support shaft 120 into the coupling hole 111 under a predetermined pressure.

In addition, a yoke 113 which is made of metal is provided on the base plate 110 at a position facing a magnet 164 of the rotor casing 160 such that attractive force is formed between the yoke 113 and the magnet 164.

The stationary support shaft 120 rotatably supports the sleeve 130 and generally has a cylindrical shape. A lower end of the stationary support shaft 120 has a diameter less than that of a portion thereof which is inserted into the sleeve 130, such that the thrush plate 150 can be fitted over the lower end of the stationary support shaft 120. Here, the thrust plate 150 which is fitted over the lower end of the stationary support shaft 120 may be fixed to the stationary support shaft 120 through a separate laser welding process or the like. Alternatively, the thrust plate 150 may be fastened to the stationary support shaft 120 in such a way as to force-fit the thrust plate 150 over the stationary support shaft 120 under a predetermined pressure.

Furthermore, a tapered portion 121 is formed on the stationary support shaft 120 at a position facing the sealing cap 180 to store fluid between the stationary support shaft 120 and the sealing cap 180 and form a taper seal for sealing fluid between the stationary support shaft 120 and the sleeve 130. Hence, a fluid interface is defined between the tapered portion 121 and the sealing cap 180, thus forming a second fluid sealing part 122.

Figure 2:
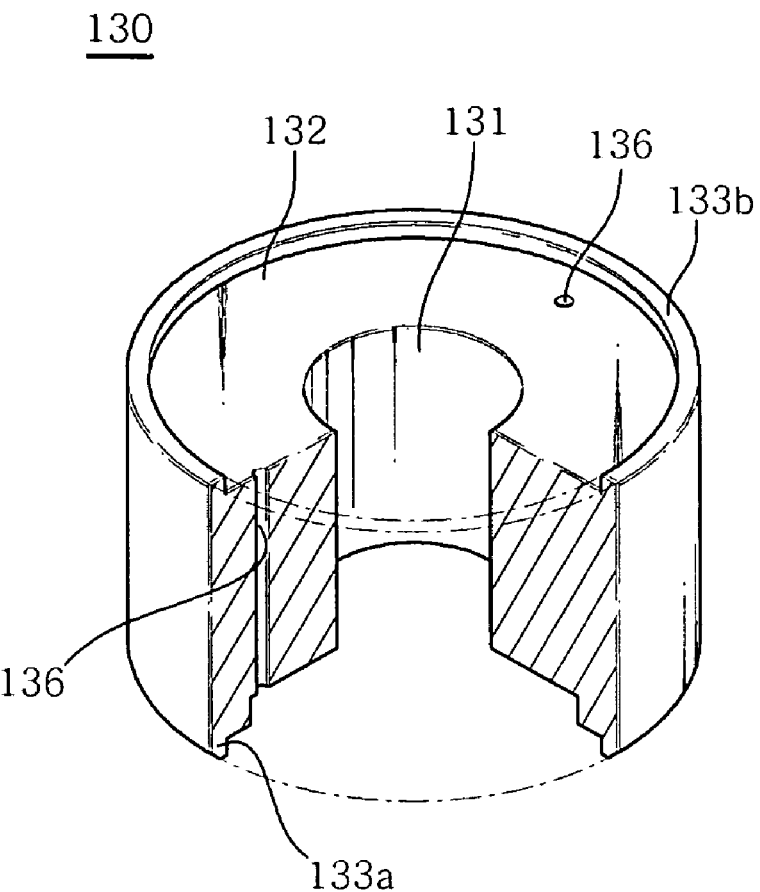
FIG. 2 is a perspective view showing a sleeve of the spindle motor of FIG. 1.

As shown in FIG. 2, the sleeve 130 is rotatably supported by the stationary support shaft 120 and supports the rotor casing 160 on the center axis thereof. In addition, the sleeve 130 generally has a hollow cylindrical shape. First and second radial bearings and a first thrust bearing are respectively formed on a circumferential inner surface 131 of the sleeve 130 which faces the stationary support shaft 120 and on a bearing surface 132 thereof which faces the thrust plate 150. Furthermore, the rims of the upper and lower surfaces of the sleeve 130 protrude in the axial direction and thus respectively form coupling protrusions 133a and 133b, into which the sealing cap 180 and the stopper 170 are respectively fitted. The sealing cap 180 is fitted into and fastened to the upper coupling protrusions 133a of the sleeve 130 by laser welding or the like. The stopper 170 is fastened to the lower coupling protrusion 133b of the sleeve 130. The thrust plate 150 is interposed between the stopper 170 and the sleeve 130.

Figure 3:
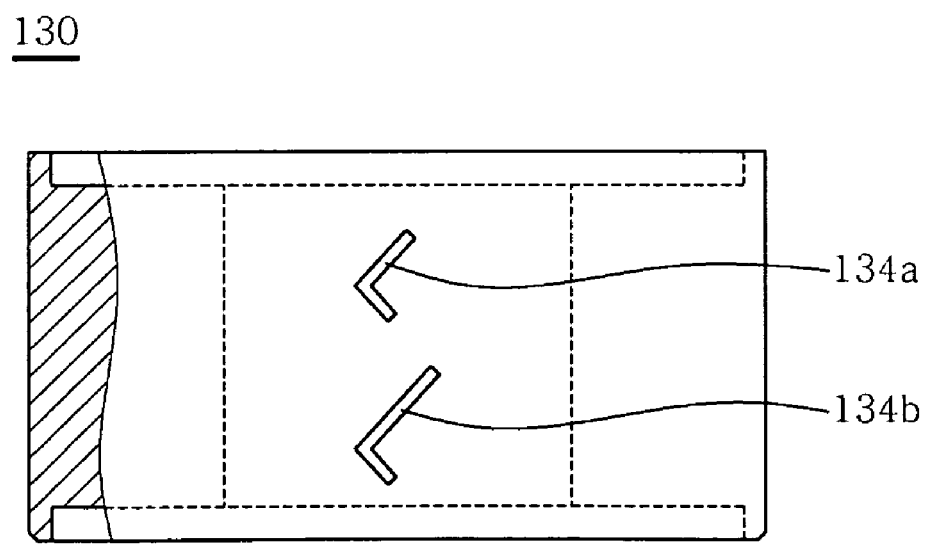
FIG. 3 is a sectional view of the sleeve of FIG. 2.

As shown in FIG. 3, first and second dynamic pressure generating grooves 134a and 134b are formed in the circumferential inner surface 131 of the sleeve 130. The first and second dynamic pressure generating grooves 134a and 134b have asymmetrical herringbone shapes and function to, when the sleeve 130 rotates, collect fluid and generate fluid dynamic pressure and simultaneously pump fluid toward the thrust plate 150. The first radial bearing is formed by the first dynamic pressure generating groove 134a, and the second radial bearing is formed by the second dynamic pressure generating groove 134b.

As shown in FIGS. 1 and 2, two fluid circulation holes 136 for circulating fluid are formed through the sleeve 130 in the axial direction. The fluid circulation holes 136 extend from the upper surface of the sleeve 130 which faces the sealing cap 180 to the bearing surface 132 which faces the thrust plate 150, so that fluid circulates through the fluid circulation holes 136. That is, fluid is pumped to the first thrust bearing by pumping force generated by the first and second dynamic pressure generating grooves 134a and 134b and, thereafter, flows to the sealing cap 180 and the sleeve 130 via the fluid circulation holes 136. Therefore, in the present invention, fluid can be reliably provided to a portion where fluid may be insufficient.

The armature 140 forms an electric field using external power applied thereto so as to rotate the rotor casing 160 provided with a magnetic disk. The armature 140 includes a core 141 which is formed by placing thin metal plates on top of one another, and a coil 142 which is wound around the core 141 many times.

The core 141 is firmly fitted over the circumferential outer surface of the fitting protrusion 112 of the base plate 110. The coil 142 which is wound around the core 141 forms an electric field when a current is applied from the outside to the coil 142, thus rotating the rotor casing 160 using electromagnetic force formed between the coil 142 and the magnet 164 of the rotor casing 160.

Figure 4:
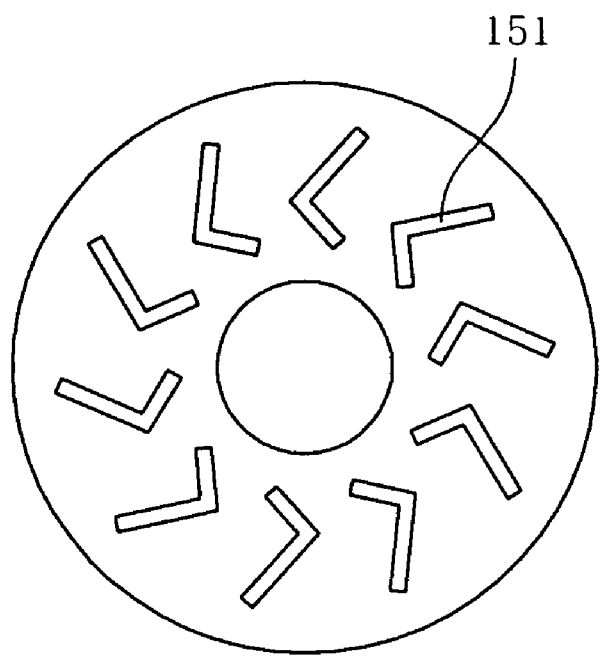
FIG. 4 is a front view of a thrust plate of the spindle motor of FIG. 1.

The thrust plate 150 is fastened to the stationary support shaft 120. The thrust plate 150 forms the first thrust bearing between it and the sleeve 130 and forms a second thrust bearing between it and the stopper 170. As shown in FIG. 4, first thrust dynamic pressure generating grooves 151 are formed in a surface of the thrust plate 150 which faces the bearing surface 132 of the sleeve 130. When the sleeve 130 rotates, the first thrust dynamic pressure generating grooves 151 focus fluid that is contained between the sleeve 130 and the thrust plate 150 on one point, thus generating fluid dynamic pressure. Thereby, the first thrust bearing is formed between the sleeve 130 and the thrust plate 150. Furthermore, the first thrust dynamic pressure generating grooves 151 which are formed in the thrust plate 150 may have asymmetrical shapes appropriate to pump fluid towards the stationary support shaft 120.

The rotor casing 160 seats a magnetic disk (not shown), such as a hard disk, thereon and rotates it. The rotor casing 160 includes a circular plate 162 which is firmly fitted over the sleeve 130, and an annular rim part 163 which extends from the outer edge of the circular plate 162.

In detail, the stationary support shaft 120 is inserted into the central portion of the circular plate 162. The rim part 163 extends a predetermined length from the outer edge of the circular plate 162 in the axial direction of the stationary support shaft 120 such that the circumferential inner surface thereof faces the armature 140. The magnet 164, which forms a magnetic field to generate electromagnetic force between it and the electric field formed by the coil 142, is fastened to the circumferential inner surface of the rim part 163.

Figure 5:
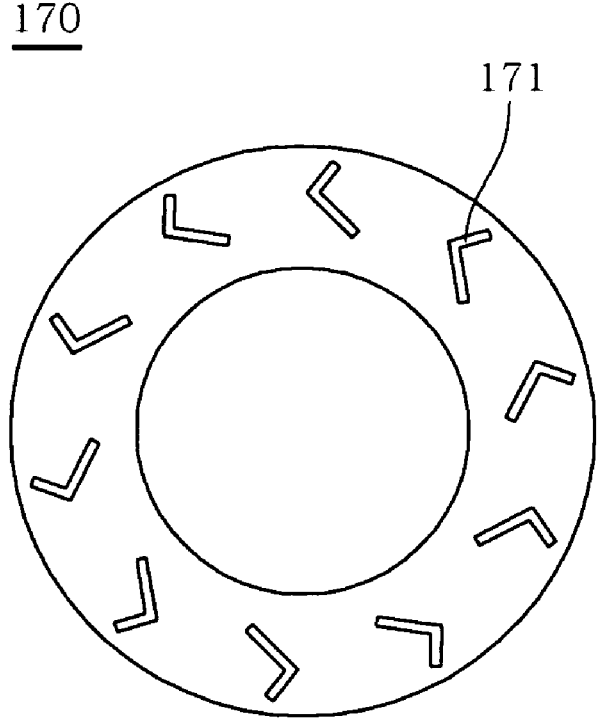
FIG. 5 is a front view of a stopper of the spindle motor of FIG. 1.

The stopper 170 is fastened to the sleeve 130 at a position facing the thrust plate 150 and functions to prevent the sleeve 130 from being undesirably removed. In detail, the stopper 170 is fixed to the lower coupling protrusion 133b of the sleeve 130 by laser welding or the like such that the stopper 170 faces the lower surface of the thrust plate 150. As shown in FIG. 5, the stopper 170 has an annular disk shape. Second thrust dynamic pressure generating grooves 171 are formed in the stopper 170 to form a second thrust bearing between the stopper 170 and the thrust plate 150. When the sleeve 130 rotates, the second thrust dynamic pressure generating grooves 171 focus fluid that is contained between the stopper 170 and the thrust plate 150 on one point, thus generating fluid dynamic pressure. Thereby, the second thrust bearing is formed between the stopper 170 and the thrust plate 150. Furthermore, the second thrust dynamic pressure generating grooves 171 which are formed in the stopper 170 may have asymmetrical shapes appropriate to pump fluid in a direction away from the stationary support shaft 120.

Meanwhile, the stopper 170 may be configured such that an inner edge thereof which forms a center hole of the stopper 470 is tapered towards the thrust plate 150 to form a taper seal of fluid between the stopper 170 and the thrust plate 150. In other words, as shown in FIG. 1, the inner edge of the stopper 170 has an inclined surface 172 which is inclined towards the thrust plate 150. A first fluid sealing part 173 is formed between the inclined surface 172 of the stopper 170 and the lower surface of the thrust plate 150 to store fluid therebetween.

The sealing cap 180 functions to move fluid, which circulates using pumping force of the radial bearing, towards the radial bearing again. The sealing cap 180 is fitted into and fastened to the upper coupling protrusion 133a of the sleeve 130 such that it faces the upper surface of the sleeve 130. Here, the sealing cap 180 has an annular disk shape. An inner edge of the sealing cap 180 which forms a center hole thereof faces the tapered portion 121 of the stationary support shaft 120. A fluid interface is defined between the tapered portion 121 and the inner edge of the sealing cap 180, thus forming the second fluid sealing part 122. In addition, fluid is charged between the sealing cap 180 and the upper surface of the sleeve 130.

In the spindle motor 100 according to the first embodiment of the present invention having the above-mentioned construction, fluid circulates in such a way that it flows through the first and second radial bearings, the first and second thrust bearings, the fluid circulation holes 136 and the sealing cap 180 and flows the first and second radial bearings again.

The operation of the spindle motor 100 and the dynamic bearing according to the first embodiment of the present invention will be described with reference to FIG. 1.

First, when the spindle motor 100 is not in operation, the bearing surface 132 of the sleeve 130 is in a state of being in contact with the upper surface of the thrust plate 150. When external power is applied to the armature 140, the rotor casing 160 and the sleeve 130 are rotated by electromagnetic force generated between an electric field formed by the armature 140 and a magnetic field formed by the magnet 164.

Next, when the sleeve 130 rotates by a predetermined number of revolutions, fluid dynamic pressure is generated by the first and second radial bearings and the first and second thrust bearings. The circumferential inner surface 131 of the sleeve 130 and the circumferential outer surface of the stationary support shaft 120 are maintained in a state of being not brought into contact with each other by dynamic pressure generated by the first and second radial bearings. The bearing surface 132 of the sleeve 130 is raised upwards from the thrust plate 150 by dynamic pressure generated by the first thrust bearing. The stopper 170 and the thrust plate 150 are maintained in a state of being not brought into contact with each other by dynamic pressure generated by the second thrust bearing. That is, the first and second thrust bearings support the thrust plate 150 such that the thrust plate 150 is not brought into contact with the bearing surface 132 of the sleeve 130 and the stopper 170.

Furthermore, by the force with which the second radial bearing pumps fluid, the fluid circulates in a such way that it flows towards the first radial bearing after passing through the first thrust bearing, the fluid circulation holes 136 and the sealing cap 180.

In the spindle motor 100 according to the first embodiment of the present invention having the above-mentioned construction and operation, when the sleeve 130 rotates, it can be maintained at a predetermined height by the first and second thrust bearings, so that the spindle motor 100 can be reliably and smoothly operated.

Second Embodiment

Figure 6:
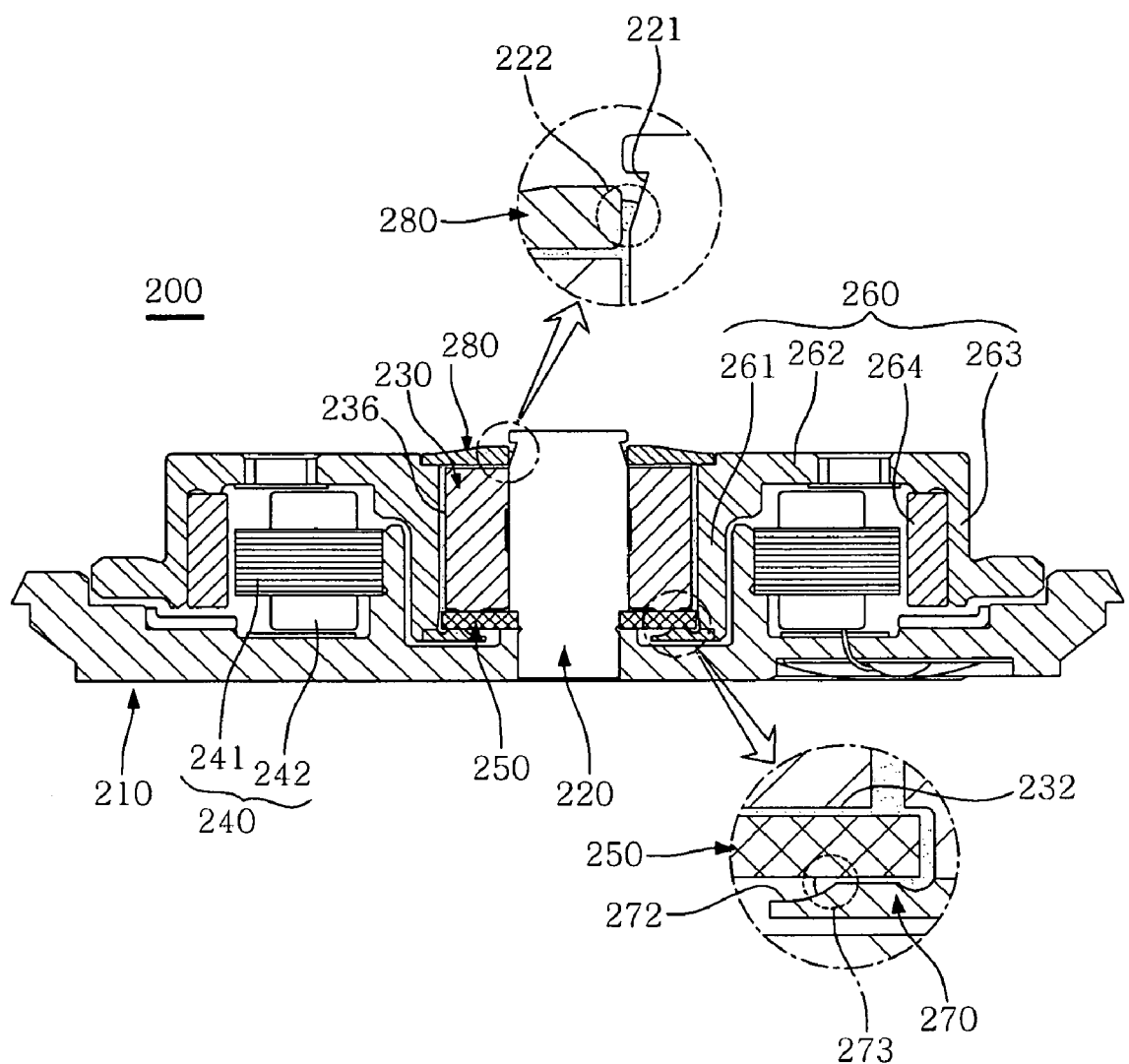
FIG. 6 is a sectional view of a spindle motor, according to a second embodiment of the present invention.
Figure 7:
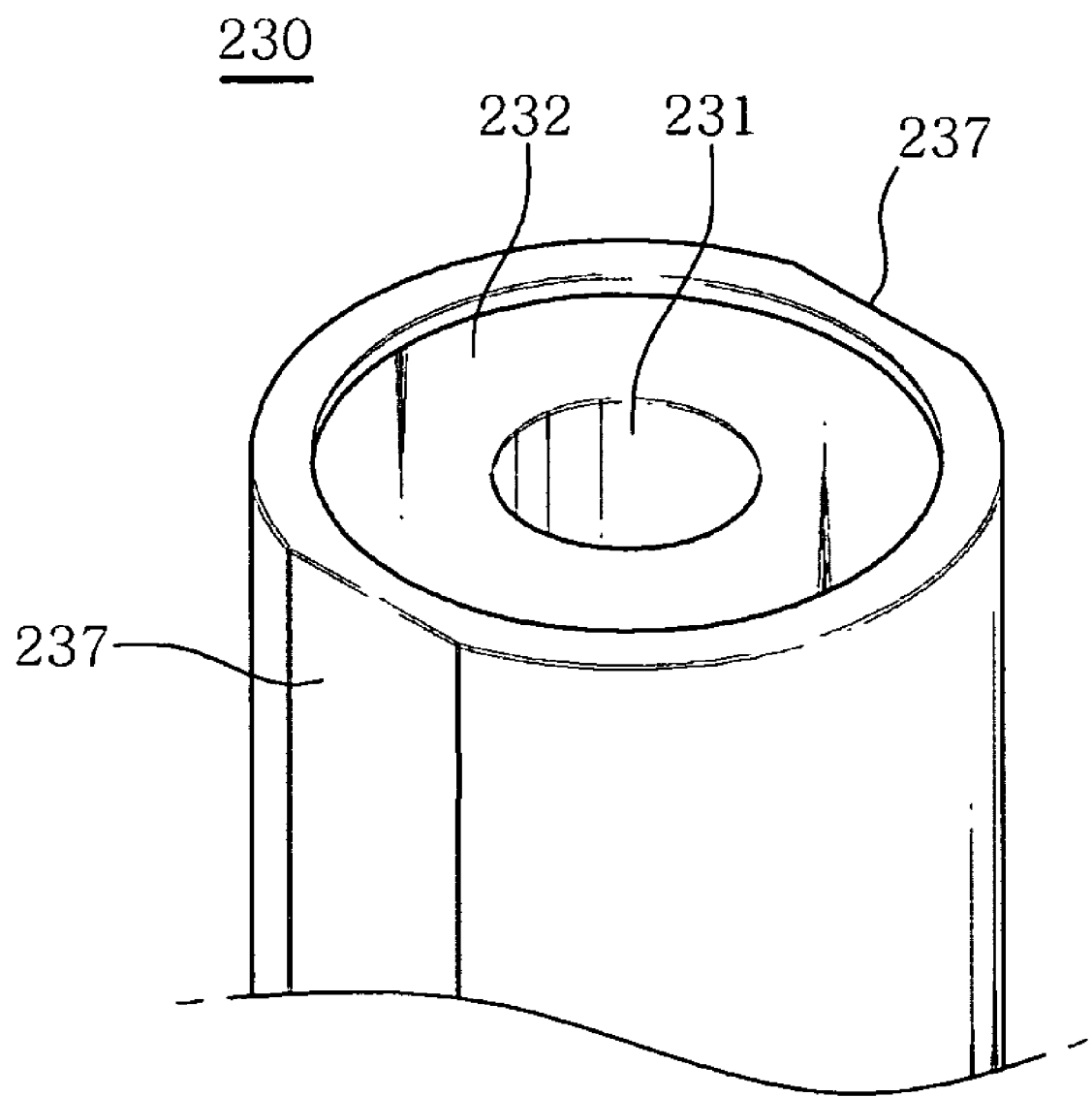
FIG. 7 is a perspective view showing a sleeve of the spindle motor of FIG. 6.

As shown in FIGS. 6 and 7, a spindle motor 200 according to a second embodiment of the present invention includes a base plate 210, a stationary support shaft 220, a sleeve 230, an armature 240, a thrust plate 250, a rotor casing 260, a stopper 270 and a sealing cap 280. The general construction of the spindle motor 200 according to the second embodiment is similar to that of the spindle motor 100 of the first embodiment, therefore detailed explanation of the same construction between the first and second embodiments will be omitted.

As shown in FIG. 7, the sleeve 230 according to the second embodiment is rotatably supported by the stationary support shaft 220 and supports the rotor casing 260 on the center axis thereof. In addition, the sleeve 230 generally has a hollow cylindrical shape. First and second radial bearings and a first thrust bearing are formed on a circumferential inner surface 231 of the sleeve 230 which faces the stationary support shaft 220 and on a bearing surface 232 thereof which faces the thrust plate 250.

Furthermore, first and second dynamic pressure generating grooves 234a and 234b which have asymmetrical herringbone shapes in the same manner as those of FIG. 3 are formed in a circumferential inner surface 231 of the sleeve 230. The first and second dynamic pressure generating grooves 234a and 234b function to, when the sleeve 230 rotates, collect fluid and generate fluid dynamic pressure and simultaneously pump fluid toward the thrust plate 250. The first radial bearing is formed by the first dynamic pressure generating groove 234a, and the second radial bearing is formed by the second dynamic pressure generating groove 234b.

In addition, as shown in FIGS. 6 and 7, two fluid circulation holes 236 for circulating fluid are defined by the sleeve 230 in the axial direction. Unlike the fluid circulation holes 136 of the first embodiment, in the second embodiment, cut surfaces 237 are formed on the sleeve 230 by cutting off portions of the circumferential outer surface thereof such that each cutout has a D shape, and the fluid circulation holes 236 are defined between the cut surfaces 237 of the sleeve 230 and a hub 261 of the rotor casing 260 into D shapes.

The fluid circulation holes 236 extend from the upper surface of the sleeve 230 which faces the sealing cap 280 to the bearing surface 232 which faces the thrust plate 250 such that fluid circulates through the fluid circulation holes 236. That is, fluid is pumped to the first thrust bearing by pumping force generated by the first and second dynamic pressure generating grooves 234a and 234b and, thereafter, flows to the sealing cap 280 and the sleeve 230 via the fluid circulation holes 236. Therefore, in the present invention, fluid can be reliably provided to a region where fluid may be insufficient The rotor casing 260 according to the second embodiment seats a magnetic disk (not shown), such as a hard disk, thereon and rotates it. The rotor casing 260 includes the cylindrical hub 261 which is fitted over the sleeve 230, a circular plate 262 which extends from the hub 261 in a radial direction, and an annular rim part 263 which extends from the outer edge of the circular plate 262.

The sleeve 230 is inserted into and fastened to the hub 261. The hub 261 defines the fluid circulation holes 236 between it and the cut surfaces 237, which are formed on the circumferential outer surface of the sleeve 230. In other words, D-shaped spaces defined between the inner surface of the hub 261 and the cut surfaces 237 of the sleeve 230 form the fluid circulation holes 236 through which fluid circulates. The circular plate 262 integrally extends from the hub 261 in the radial direction. The rim part 263 extends a predetermined length from the outer edge of the circular plate 262 in the axial direction of the stationary support shaft 220 such that the circumferential inner surface thereof faces the armature 240. A magnet 264, which forms a magnetic field to generate electromagnetic force between it and an electric field formed by a coil 242, is fastened to the circumferential inner surface of the rim part 263.

The stopper 270 is fastened to the hub 261 of the rotor casing 260 at a position facing the thrust plate 250 and functions to prevent the sleeve 230 from being undesirably removed. In detail, the stopper 270 is fixed to the lower end of the hub 261 by laser welding or the like such that it faces the lower surface of the thrust plate 250. Furthermore, the stopper 270 generally has an annular disk shape. In the same manner as that in FIG. 5, second thrust dynamic pressure generating grooves 271 are formed in the stopper 270 to form a second thrust bearing between the stopper 270 and the thrust plate 250. When the sleeve 230 rotates, the second thrust dynamic pressure generating grooves 271 focus fluid that is contained between the stopper 270 and the thrust plate 250 on one point, thus generating fluid dynamic pressure. Thereby, the second thrust bearing, is formed between the stopper 270 and the thrust plate 250. Furthermore, the second thrust dynamic pressure generating grooves 271 which are formed in the stopper 270 may have asymmetrical shapes appropriate to pump fluid in a direction away from the stationary support shaft 220.

Meanwhile, the stopper 270 may be configured such that an inner edge thereof which forms a center hole of the stopper 270 is tapered towards the thrust plate 250 to form a taper seal of fluid between the stopper 270 and the thrust plate 250. In other words, as shown in FIG. 6, the inner edge of the stopper 270 has an inclined surface 272 which is inclined towards the thrust plate 250. A first fluid sealing part 273 is formed between the inclined surface 272 of the stopper 270 and the lower surface of the thrust plate 250 to store fluid therebetween.

The sealing cap 280 functions to move fluid, which circulates using pumping force of the radial bearing, towards the radial bearing again. The sealing cap 280 is fitted into and fastened to the upper end of the hub 261 of the rotor casing 260 such that it faces the upper surface of the sleeve 230. Here, the sealing cap 280 has an annular disk shape. An inner edge of the sealing cap 280 which forms a center hole thereof faces the tapered portion 221 of the stationary support shaft 220. A fluid interface is defined between the tapered portion 221 and the inner edge of the sealing cap 280, thus forming the second fluid sealing part 222. In addition, fluid is charged between the sealing cap 280 and the upper surface of the sleeve 230.

In the spindle motor 200 according to the second embodiment of the present invention having the above-mentioned construction, fluid circulates in such a way that it flows through the first and second radial bearings, the first and second thrust bearings, the fluid circulation holes 236 and the sealing cap 280 and flows the first and second radial bearings again.

The operation of the spindle motor 200 and the dynamic bearing according to the second embodiment of the present invention will be described with reference to FIG. 6.

First, when the spindle motor 200 is not in operation, the bearing surface 232 of the sleeve 230 is in a state of being in contact with the upper surface of the thrust plate 250. When external power is applied to the armature 240, the rotor casing 260 and the sleeve 230 are rotated by electromagnetic force generated between an electric field formed by the armature 240 and a magnetic field formed by the magnet 264.

Next, when the sleeve 230 rotates by a predetermined number of revolutions, fluid dynamic pressure is generated by the first and second radial bearings and the first and second thrust bearings. The circumferential inner surface 231 of the sleeve 230 and the circumferential outer surface of the stationary support shaft 220 are maintained in a state of being not brought into contact with each other by dynamic pressure generated by the first and second radial bearings. The bearing surface 232 of the sleeve 230 is raised upwards from the thrust plate 250 by dynamic pressure generated by the first thrust bearing. The stopper 270 and the thrust plate 250 are maintained in a state of being not brought into contact with each other by dynamic pressure generated by the second thrust bearing. That is, the first and second thrust bearings support the thrust plate 250 such that the thrust plate 250 is not brought into contact with the bearing surface 232 of the sleeve 230 and the stopper 270.

Furthermore, by force with which the second radial bearing pumps fluid, the fluid circulates in a such way that it flows towards the first radial bearing after passing through the first thrust bearing, the fluid circulation holes 236 and the sealing cap 280.

In the spindle motor 200 according to the second embodiment of the present invention having the above-mentioned construction and operation, when the sleeve 230 rotates, it can be maintained at a predetermined height by the first and second thrust bearings, so that the spindle motor 200 can be reliably and smoothly operated.

Third Embodiment

Figure 8:
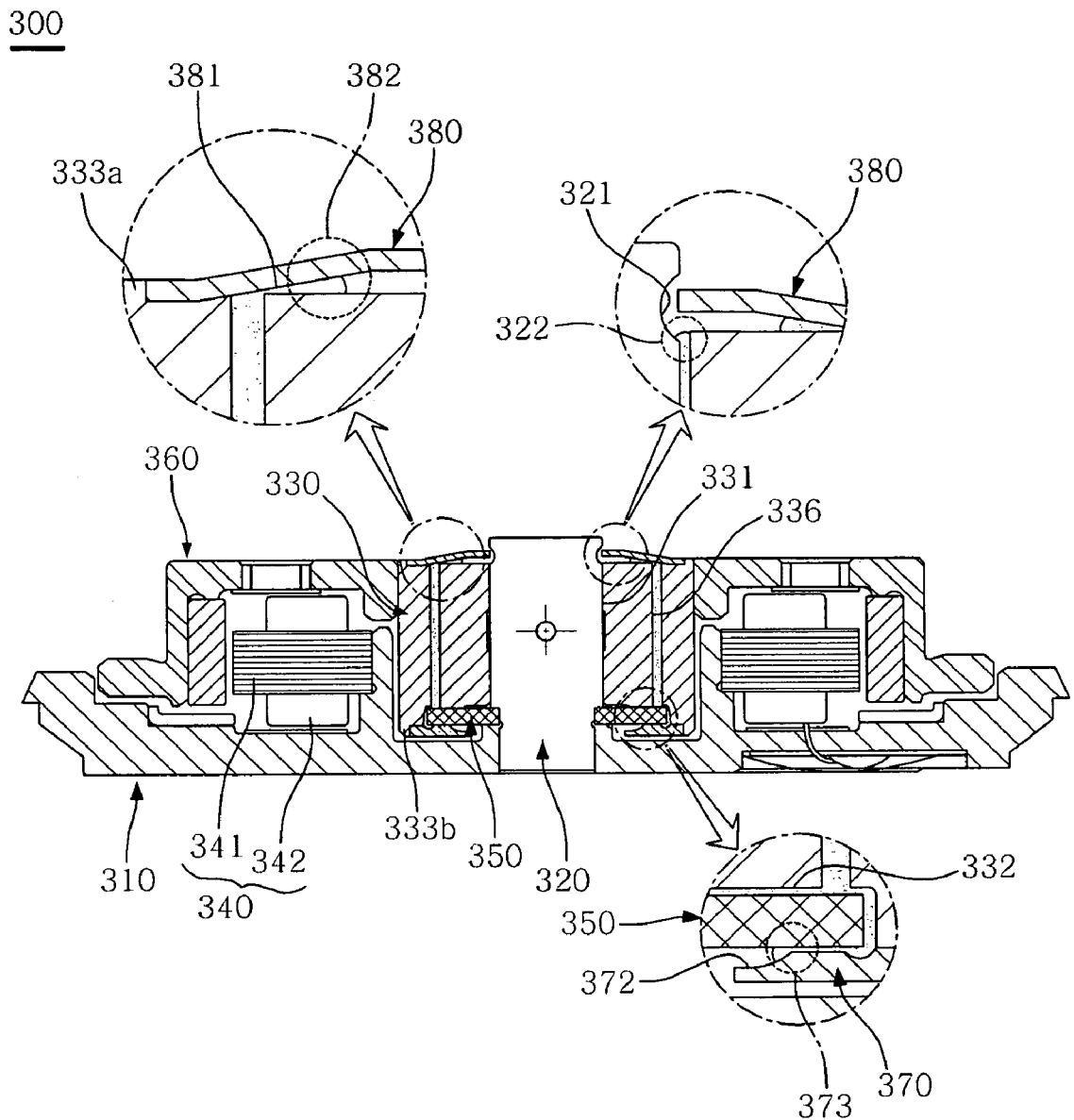
FIG. 8 is a sectional view of a spindle motor, according to a third embodiment of the present invention.

As shown in FIG. 8, a spindle motor 300 according to a third embodiment of the present invention includes a base plate 310, a stationary support shaft 320, a sleeve 330, an armature 340, a thrust plate 350, a rotor casing 360, a stopper 370 and a sealing plate 380. The general construction of the spindle motor 300 according to the third embodiment is similar to that of the spindle motor 100 of the first embodiment, therefore detailed explanation of the same construction between the first and third embodiments will be omitted.

The stationary support shaft 320 rotatably supports the sleeve 330 and generally has a cylindrical shape. A lower end of the stationary support shaft 320 has a diameter less than that of a portion thereof which is inserted into the sleeve 330, such that the thrush plate 350 can be fitted over the lower end of the stationary support shaft 320. Here, the thrust plate 350 which is fitted over the lower end of the stationary support shaft 320 may be fixed to the stationary support shaft 320 through a separate laser welding process or the like. Alternatively, the thrust plate 350 may be fastened to the stationary support shaft 320 in such a way as to force-fit the thrust plate 350 over the stationary support shaft 320 under a predetermined pressure.

Furthermore, a tapered portion 321 is formed on the stationary support shaft 320 at a position facing the upper end of the sleeve 330 to store fluid between the stationary support shaft 320 and the sleeve 330 and form a taper seal for sealing fluid between the stationary support shaft 320 and the sleeve 330. Hence, a fluid interface is defined between the tapered portion 321 and the sleeve 330, thus forming a first fluid sealing part 322.

The sleeve 330 is rotatably supported by the stationary support shaft 320 and supports the rotor casing 360 on the center axis thereof. In the same manner as the sleeve 130 of the first embodiment of FIG. 2, the sleeve 330 generally has a hollow cylindrical shape. First and second radial bearings and a first thrust bearing are respectively formed on a circumferential inner surface 331 of the sleeve 330 which faces the stationary support shaft 320 and on a bearing surface 332 thereof which faces the thrust plate 350. Furthermore, the rims of the upper and lower surfaces of the sleeve 330 protrude in the axial direction and thus respectively form coupling protrusions 333a and 333b, into which the sealing plate 380 and the stopper 370 are respectively fitted. The sealing plate 380 is fitted into and fastened to the upper coupling protrusions 333a of the sleeve 330 by laser welding or the like. The stopper 370 is fastened to the lower coupling protrusion 333b of the sleeve 330. The thrust plate 350 is interposed between the stopper 370 and the sleeve 330.

Furthermore, in the same manner as the first embodiment of FIG. 3, first and second dynamic pressure generating grooves 334a and 334b are formed in the circumferential inner surface 331 of the sleeve 330. The first and second dynamic pressure generating grooves 334a and 334b have asymmetrical herringbone shapes and function to, when the sleeve 330 rotates, collect fluid and generate fluid dynamic pressure. The first radial bearing is formed by the first dynamic pressure generating groove 334a, and the second radial bearing is formed by the second dynamic pressure generating groove 334b.

In addition, two communication holes 336 are axially formed through the sleeve 330 to store fluid therein, in a manner similar to that of FIG. 2. The communication holes 336 extend from the upper surface of the sleeve 330 which faces the sealing plate 380 to the bearing surface 332 which faces the thrust plate 350, so that fluid can be supplied to the bearing surface 332 through the communication holes 336.

The stopper 370 is fastened to the sleeve 330 at a position facing the thrust plate 350 and functions to prevent the sleeve 330 from being undesirably removed. In detail, the stopper 370 is fixed to the lower coupling protrusion 333b of the sleeve 330 by laser welding or the like such that the stopper 370 faces the lower surface of the thrust plate 350. Furthermore, the stopper 370 has an annular disk shape. Second thrust dynamic pressure generating grooves 371 having the same shapes as those of FIG. 5 are formed in the stopper 370 to form a second thrust bearing between the stopper 370 and the thrust plate 350. When the sleeve 330 rotates, the second thrust dynamic pressure generating grooves 371 focus fluid that is contained between the stopper 370 and the thrust plate 350 on one point, thus generating fluid dynamic pressure. Thereby, the second thrust bearing is formed between the stopper 370 and the thrust plate 350.

Meanwhile, the stopper 370 may be configured such that an inner edge thereof which forms a center hole of the stopper 370 is tapered towards the thrust plate 350 to form a taper seal of fluid between the stopper 370 and the thrust plate 350. In other words, as shown in FIG. 8, the inner edge of the stopper 370 has an inclined surface 372 which is inclined towards the thrust plate 350. A second fluid sealing part 373 is formed between the inclined surface 372 of the stopper 370 and the lower surface of the thrust plate 350 to store fluid therebetween.

Figure 9:
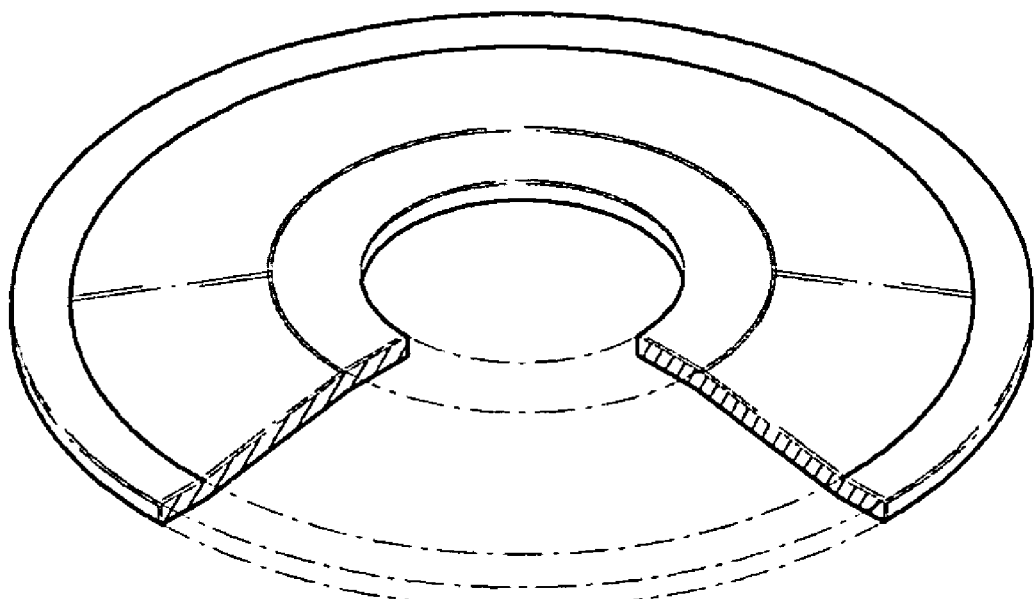
FIG. 9 is a partially broken perspective view showing a sealing plate of the spindle motor of FIG. 8.

The sealing plate 380 functions to form a taper seal in the communication holes 336 formed in the sleeve 330. The sealing plate 380 is fastened to the upper coupling protrusion 333a of the sleeve 330 such that it faces the upper surface of the sleeve 330. As shown in FIG. 9, the sealing plate 380 has an annular disk shape and is configured such that a portion 381 thereof which faces the upper surface of the sleeve 330 is inclined. In addition, a fluid interface is formed between the upper surface of the sleeve 330 and the inclined portion 381 of the sealing plate 380, thereby forming a third fluid sealing part 382.

Fourth Embodiment

Figure 10:
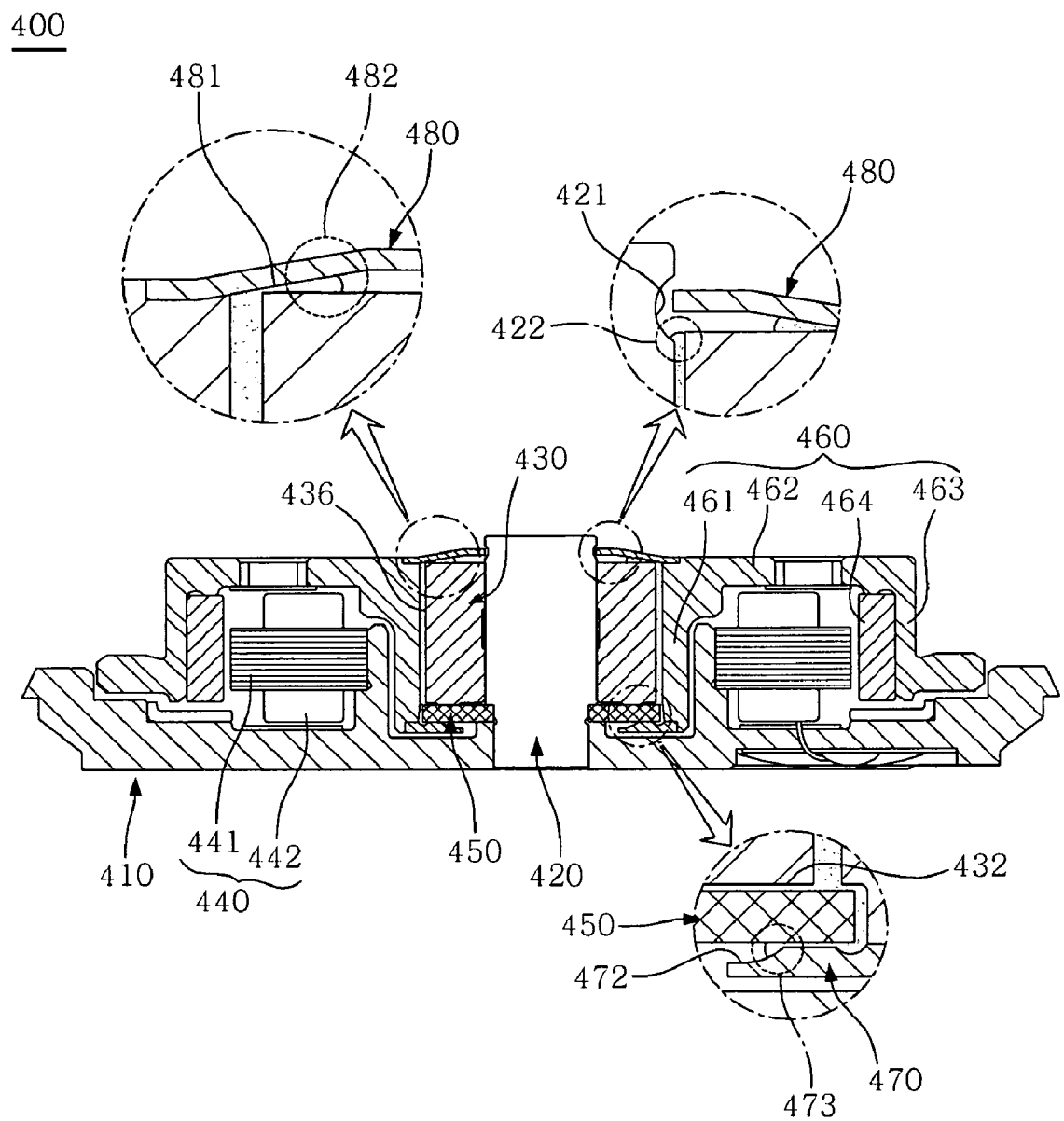
FIG. 10 is a sectional view of a spindle motor, according to a fourth embodiment of the present invention.
Figure 11:
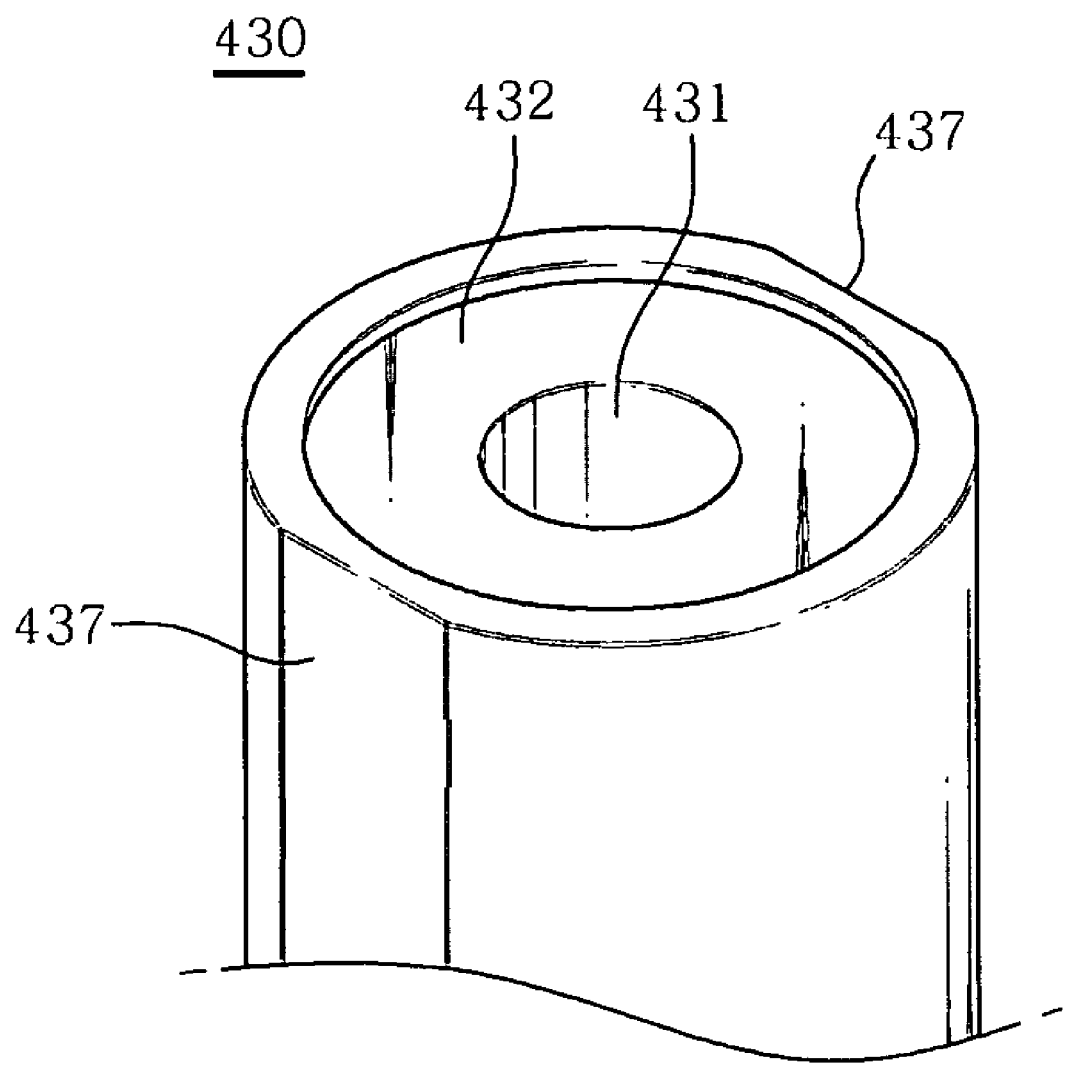
FIG. 11 is a perspective view showing a sleeve of the spindle motor of FIG. 10.

As shown in FIGS. 10 and 11, a spindle motor 400 according to a fourth embodiment of the present invention includes a base plate 410, a stationary support shaft 420, a sleeve 430, armature 440, a thrust plate 450, a rotor casing 460, a stopper 470 and a sealing plate 480. The general construction of the spindle motor 400 according to the fourth embodiment is similar to that of the spindle motor 100 of the first embodiment of FIG. 1, the spindle motor 200 of the second embodiment of FIG. 6 or the spindle motor 300 of the third embodiment of FIG. 8, therefore detailed explanation of the same construction therebetween will be omitted.

The stationary support shaft 420 rotatably supports the sleeve 430 and generally has a cylindrical shape. A lower end of the stationary support shaft 420 has a diameter less than that of a portion thereof which is inserted into the sleeve 430, such that the thrush plate 450 can be fitted over the lower end of the stationary support shaft 420. Here, the thrust plate 450 which is fitted over the lower end of the stationary support shaft 420 may be fixed to the stationary support shaft 420 through a separate laser welding process or the like. Alternatively, the thrust plate 450 may be fastened to the stationary support shaft 420 in such a way as to force-fit the thrust plate 450 over the stationary support shaft 420 under a predetermined pressure.

Furthermore, a tapered portion 421 is formed on the stationary support shaft 420 at a position facing the upper end of the sleeve 430 to store fluid between the stationary support shaft 420 and the sleeve 430 and form a taper seal for sealing fluid between the stationary support shaft 420 and the sleeve 430. Hence, a fluid interface is defined between the tapered portion 421 and the sleeve 430, thus forming a first fluid sealing part 422.

As shown in FIG. 11, the sleeve 430 is rotatably supported by the stationary support shaft 420 and supports the rotor casing 460 on the center axis thereof. In addition, the sleeve 430 generally has a hollow cylindrical shape. First and second radial bearings and a first thrust bearing are respectively formed on a circumferential inner surface 431 of the sleeve 430 which faces the stationary support shaft 420 and on a bearing surface 432 thereof which faces the thrust plate 450.

Furthermore, first and second dynamic pressure generating grooves 434a and 434b are formed in the circumferential inner surface 431 of the sleeve 430. In the same manner as FIG. 3, the first and second dynamic pressure generating grooves 434a and 434b have asymmetrical herringbone shapes and function to, when the sleeve 430 rotates, collect fluid and generate fluid dynamic pressure. The first radial bearing is formed by the first dynamic pressure generating groove 434a, and the second radial bearing is formed by the second dynamic pressure generating groove 434b.

In addition, as shown in FIGS. 10 and 11, two communication holes 436 are axially formed through the sleeve 430 to store fluid therein. Unlike the third embodiment of FIG. 8, in the fourth embodiment, cut surfaces 437 are formed on the sleeve 430 by cutting off portions of the circumferential outer surface thereof such that each cutout has a D shape, and the communication holes 436 are defined between the cut surfaces 437 of the sleeve 430 and a hub 461 of the rotor casing 460 into D shapes.

The communication holes 436 extend from the upper surface of the sleeve 430 which faces the sealing plate 480 to the bearing surface 432 which faces the thrust plate 450, so that fluid can be supplied to the bearing surface 432 through the communication holes 436.

The rotor casing 460 seats a magnetic disk (not shown), such as a hard disk, thereon and rotates it. The rotor casing 460 includes the cylindrical hub 461 which is fitted over the sleeve 430, a circular plate 462 which extends from the hub 461 in a radial direction, and an annular rim part 463 which extends from the outer edge of the circular plate 462.

The sleeve 430 is inserted into and fastened to the hub 461. The hub 461 defines the communication holes 436 between it and the cut surfaces 437, which are formed on the circumferential outer surface of the sleeve 430. In other words, D-shaped spaces defined between the inner surface of the hub 461 and the cut surfaces 437 of the sleeve 430 form the communication holes 436, which store fluid therein. The circular plate 462 integrally extends from the hub 461 in the radial direction. The rim part 463 extends a predetermined length from the outer edge of the circular plate 462 in the axial direction of the stationary support shaft 420 such that the circumferential inner surface thereof faces the armature 440. A magnet 464, which forms a magnetic field to generate electromagnetic force between it and an electric field formed by a coil 442, is fastened to the circumferential inner surface of the rim part 463.

The stopper 470 is fastened to the hub 461 of the rotor casing 460 at a position facing the thrust plate 450 and functions to prevent the sleeve 430 from being undesirably removed. In detail, the stopper 470 is fixed to the lower end of the hub 461 by laser welding or the like such that it faces the lower surface of the thrust plate 450. Furthermore, the stopper 470 generally has an annular disk shape. Second thrust dynamic pressure generating grooves 471 having the same shapes as those of FIG. 5 are formed in the stopper 470 to form a second thrust bearing between the stopper 470 and the thrust plate 450. When the sleeve 430 rotates, the second thrust dynamic pressure generating grooves 471 focus fluid that is contained between the stopper 470 and the thrust plate 450 on one point, thus generating fluid dynamic pressure. Thereby, the second thrust bearing is formed between the stopper 470 and the thrust plate 450.

Meanwhile, the stopper 470 may be configured such that an inner edge thereof which forms a center hole of the stopper 470 is tapered towards the thrust plate 450 to form a taper seal of fluid between the stopper 470 and the thrust plate 450. In other words, as shown in FIG. 10, the inner edge of the stopper 470 has an inclined surface 472 which is inclined towards the thrust plate 450. A first fluid sealing part 473 is formed between the inclined surface 472 of the stopper 470 and the lower surface of the thrust plate 450 to store fluid therebetween.

The sealing plate 480 functions to form a taper seal in the communication holes 436 formed in the sleeve 430. The sealing plate 480 is fastened to the hub 461 of the rotor casing 460 such that it faces the upper surface of the sleeve 430. In the same manner as that of FIG. 9, the sealing plate 480 has an annular disk shape and is configured such that a portion 481 thereof which faces the upper surface of the sleeve 430 is inclined. In addition, a fluid interface is formed between the upper surface of the sleeve 430 and the inclined portion 481 of the sealing plate 480, thereby forming a third fluid sealing part 482.

As described above, the present invention provides a spindle motor in which a stationary support shaft is fastened to a base plate and a sleeve is rotatably supported by the stationary support shaft so that even if external vibration is applied to the spindle motor, the amplitude of vibration can be reduced.

Furthermore, a fluid circulation hole is formed through the sleeve, and fluid can be supplied to a radial bearing and a thrust bearing.

Alternatively, a communication hole, through which fluid is transported from first and second fluid sealing parts to a third fluid sealing part, may be formed through the sleeve, so that fluid can be supplied to the thrust bearing and the radial bearing and the fluid can be prevented from leaking.

In addition, two or more fluid sealing parts which are connected to the corresponding fluid dynamic bearings and store fluid therein. Thus, a reduction in the amount of fluid attributable to evaporation can be prevented, and dispersion of fluid injected into the spindle motor when assembled can be reduced. Therefore, the reliability of the spindle motor can be enhanced.

As well, a thrust plate and a stopper are disposed under the stationary support shaft, and the radial bearing is formed adjacent to the center of the rotor casing, onto which a magnetic disk is placed. Therefore, even if external vibration is applied to the spindle motor, the amplitude of vibration of the rotor casing can be reduced.

Although the embodiments of the spindle motor of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spindle motor, comprising:
a stationary support shaft perpendicularly fastened to a base plate;
a thrust plate fitted over the stationary support shaft at a position adjacent to the base plate;
a sleeve fitted over the stationary support shaft so as to be rotatable, the sleeve being coupled to a rotor casing, onto which a magnetic disk is seated, the rotor casing surrounding a circumferential outer surface of the sleeve;
an annular stopper fastened to the sleeve or the rotor casing to support a lower surface of the thrust plate and prevent the sleeve from being removed from the stationary support shaft, the stopper forming a first fluid sealing part between the stopper and the thrust plate; and
an annular sealing cap coupled to the sleeve or the rotor casing to store fluid between the sealing cap and an upper surface of the sleeve and form a second fluid sealing part between the sealing cap and the stationary support shaft,
wherein the sleeve has therein a fluid circulation hole, through which the fluid, pumped by a first and second radial bearing, using dynamic pressure between the sleeve and the stationary support shaft, is moved to the first and second radial bearing via the sealing cap such that the fluid circulates around the sleeve.

2. The spindle motor as set forth in claim 1, wherein the sleeve forms a first thrust bearing between the sleeve and the thrust plate.

3. The spindle motor as set forth in claim 2, wherein the stopper forms a second thrust bearing between the stopper and the thrust plate.

4. The spindle motor as set forth in claim 3, wherein first and second dynamic pressure generating grooves are formed in the sleeve to form the first and second radial bearings, at least one of the first and second dynamic pressure generating grooves having an asymmetrical herringbone shape, the first and second dynamic pressure generating grooves pumping fluid between the sleeve and the stationary support shaft towards the first thrust bearing.

5. The spindle motor as set forth in claim 1, wherein the fluid circulation hole extends from a lower surface of the sleeve which faces the thrust plate to the upper surface of the sleeve which faces the sealing cap.

6. The spindle motor as set forth in claim 5, wherein the sealing cap is fastened to an end of the sleeve to store the fluid between the sealing cap and the sleeve.

7. The spindle motor as set forth in claim 1, wherein the fluid circulation hole comprises a D-shaped hole defined between the sleeve and the rotor casing by cutting off a portion of the circumferential outer surface of the sleeve in an axial direction.

8. The spindle motor as set forth in claim 7, wherein the sealing cap is fastened to an end of the rotor casing to store the fluid between the sealing cap and the sleeve.

9. The spindle motor as set forth in claim 8, wherein the rotor casing has a magnet to form a magnetic field, and the base plate has a metal yoke at a position facing the magnet to form an attractive force between the metal yoke and the magnet.

10. A spindle motor, comprising:
a stationary support shaft perpendicularly fastened to a base plate;
a thrust plate fitted over the stationary support shaft at a position adjacent to the base plate;
a sleeve fitted over the stationary support shaft so as to be rotatable, the sleeve being coupled to a rotor casing, onto which a magnetic disk is seated, the rotor casing surrounding a circumferential outer surface of the sleeve;
an annular stopper fastened to the sleeve or the rotor casing to support a lower surface of the thrust plate and prevent the sleeve from being removed from the stationary support shaft, the stopper forming a first fluid sealing part between the stopper and the thrust plate; and
an annular sealing cap coupled to the sleeve or the rotor casing to store fluid between the sealing cap and an upper surface of the sleeve and form a second fluid sealing part between the sealing cap and the stationary support shaft,
wherein the sleeve forms first and second radial bearings using dynamic pressure between the sleeve and the stationary support shaft and forms a first thrust bearing between the sleeve and the thrust plate, and
wherein the stopper forms a second thrust bearing between the stopper and the thrust plate.

11. The spindle motor as set forth in claim 10, wherein first and second dynamic pressure generating grooves are formed in the sleeve to form the first and second radial bearings, at least one of the first and second dynamic pressure generating grooves having an asymmetrical herringbone shape, the first and second dynamic pressure generating grooves pumping fluid between the sleeve and the stationary support shaft towards the first thrust bearing.

12. The spindle motor as set forth in claim 11, wherein the sleeve has therein a fluid circulation hole, through which the fluid, pumped by the first and second radial bearings, is moved to the first and second radial bearing via the sealing cap such that the fluid circulates around the sleeve.

13. The spindle motor as set forth in claim 12, wherein the fluid circulation hole extends from a lower surface of the sleeve which faces the thrust plate to the upper surface of the sleeve which faces the sealing cap.

14. The spindle motor as set forth in claim 13, wherein the sealing cap is fastened to an end of the sleeve to store the fluid between the sealing cap and the sleeve.

15. The spindle motor as set forth in claim 12, wherein the fluid circulation hole comprises a D-shaped hole defined between the sleeve and the rotor casing by cutting off a portion of the circumferential outer surface of the sleeve in an axial direction.

16. The spindle motor as set forth in claim 15, wherein the sealing cap is fastened to an end of the rotor casing to store the fluid between the sealing cap and the sleeve.

17. The spindle motor as set forth in claim 16, wherein the rotor casing has a magnet to form a magnetic field, and the base plate has a metal yoke at a position facing the magnet to form an attractive force between the metal yoke and the magnet.

* * * * *